United States Patent
Marciniak et al.

(10) Patent No.: US 12,187,465 B2
(45) Date of Patent: Jan. 7, 2025

(54) MODULE SEPARATION MECHANISM, IN PARTICULAR FOR ROCKETS

(71) Applicant: Siec Badawcza Lukasiewicz—Instytut Lotnictwa, Warsaw (PL)

(72) Inventors: Blazej Marciniak, Warsaw (PL); Hanna Tuchowska, Warsaw (PL)

(73) Assignee: Siec Badawcza Lukasiewicz—Instytut Lotnictwa, Warsaw (PL)

( * ) Notice: Subject to any disclaimer, the term of this patent is extended or adjusted under 35 U.S.C. 154(b) by 0 days.

(21) Appl. No.: 18/082,014

(22) Filed: Dec. 15, 2022

(65) Prior Publication Data

US 2023/0192326 A1    Jun. 22, 2023

(51) Int. Cl.
B64G 1/64    (2006.01)

(52) U.S. Cl.
CPC ............ B64G 1/645 (2013.01); B64G 1/641 (2013.01)

(58) Field of Classification Search
CPC ...... B64G 1/645; B64G 1/641; B64G 1/6459; B64G 1/64; B64G 1/6457; F42B 15/36
See application file for complete search history.

(56) References Cited

U.S. PATENT DOCUMENTS

| | | | |
|---|---|---|---|
| 2,982,497 A * | 5/1961 | Worley | F42B 15/36 244/54 |
| 3,302,569 A * | 2/1967 | Newcomb | F16L 37/002 285/394 |
| 3,368,486 A * | 2/1968 | Webb | F42B 15/36 102/378 |
| 5,248,233 A | 9/1993 | Webster | |
| 6,076,467 A | 6/2000 | Cespedosa et al. | |
| 6,227,493 B1 | 5/2001 | Holemans | |
| 7,861,976 B2 | 1/2011 | Holemans | |
| 8,607,705 B2 | 12/2013 | Golden et al. | |

(Continued)

FOREIGN PATENT DOCUMENTS

| | | | |
|---|---|---|---|
| CN | 105366077 A | 3/2016 | |
| CN | 106742081 A | 5/2017 | |

(Continued)

OTHER PUBLICATIONS

'Mechanical Springs vs Gas Springs'. Blog post [online]. OneMonroe, Mar. 12, 2019 [retrieved on Mar. 19, 2024]. Retrieved from the internet: <URL: https://monroeengineering.com/blog/mechanical-springs-vs-gas-springs/>. (Year: 2019).*

Primary Examiner — Michael C Zarroli
Assistant Examiner — Peter A Taraschi
(74) Attorney, Agent, or Firm — Young Basile Hanlon & MacFarlane, P.C.

(57) ABSTRACT

A module separation mechanism, in particular for rockets, includes a cylindrical first body, a cylindrical second body, and a ring connecting the two bodies, The ring comprises at least one tension lock together with a cover. The first body comprises at least one radially mounted actuator that is adapted to eject the tension lock together with the cover from the ring in a manner to disengage the ring. The first body further comprises at least one ejecting member adapted to eject the second body from the first body. The outer surface of the ring together with the cover is faced with the outer surface of the first body and the second body.

11 Claims, 3 Drawing Sheets

(56) References Cited

U.S. PATENT DOCUMENTS

| | | | | |
|---|---|---|---|---|
| 2010/0090066 A1* | 4/2010 | Holemans | ............... | B63B 21/08 |
| | | | | 292/144 |
| 2016/0102689 A1* | 4/2016 | Madsen | .................... | F16B 2/06 |
| | | | | 244/173.1 |
| 2019/0353197 A1* | 11/2019 | Kassel | .................... | F01D 17/10 |
| 2021/0348634 A1* | 11/2021 | Ohnemus | .............. | F16B 5/0283 |

FOREIGN PATENT DOCUMENTS

| | | | |
|---|---|---|---|
| CN | 111619831 A | | 9/2020 |
| CN | 113428388 A | * | 9/2021 |
| EP | 1675770 B1 | | 4/2016 |
| EP | 3560842 A1 | | 10/2019 |
| RU | 2161111 C1 | | 12/2000 |

\* cited by examiner

MODULE SEPARATION MECHANISM, IN PARTICULAR FOR ROCKETS

CROSS-REFERENCE TO RELATED APPLICATION(S)

This application claims priority to and the benefit of Polish Patent Application Serial No. P.439888, filed Dec. 17, 2021, the entire disclosure of which is hereby incorporated by reference.

TECHNICAL FIELD

The disclosure is directed to a module separation mechanism, in particular a non-explosive module separation mechanism for rockets.

BACKGROUND

In rocket and space technology, it is often necessary to disconnect one section of a device from another, whether for spacecrafts or satellite release. This enables, inter alia, the optimization of the rocket design and the phased rejection of successive stages (e.g., comprising engines), thereby increasing the efficiency of the entire system.

There are many methods of carrying out of this issue and they can be characterized by their size, functionality, and complexity. Most known solutions are based on explosives, which, when detonated or deflagrated, generate very high vibrations and can introduce strong disturbances to the structures to be decoupled. In addition, handling explosives poses a risk to personnel working with said structures, so the use of explosives has many limitations and requires complex procedures to ensure an acceptable level of safety. Moreover, in the vast majority of cases, the use of explosives generates a very large quantity of small and sharp fragments that may pose a threat to components in the vicinity of the system.

Patent publication U.S. Pat. No. 6,076,467 A discloses a mechanism having an externally located band and release mechanism. Such an arrangement will negatively affect the aerodynamics of the structure when used to separate rocket modules.

Patent publication EP1675770 B1 describes a mechanism comprising an explosive that increases the volume of the susceptible elements during detonation, thus separating the connection. This solution is based on explosives, thus it can still cause mechanical disturbances and introduce unwanted vibrations into the structure. Furthermore, due to its design, it does not have built-in redundancy.

Patent publication U.S. Pat. No. 8,607,705 B2 discloses a solution based on an inflated bladder that, by increasing its volume, expands the rocket modules, thusly performing separation. Such a mechanism requires high pressures to be introduced into the connection to effect separation. Thus, the mechanism requires appropriate tanks on board. In addition, if the bladder is perforated, there will be no separation.

Patent publication RU2161111 C1 discloses a mechanism based on a marman-type ring, in which the clamp is divided into multiple sections and compressed using a metal elastic band. The release mechanisms are located on the outside of the system, which excludes the possibility of using this solution to separate the rocket modules (due to disturbance of aerodynamic flow or danger of damage during handling). There is no mention in the document that the used system ensures tightness of the connected modules.

Patent publication U.S. Pat. No. 5,248,233 A describes a solution that is mainly intended for the separation of devices connected mainly by nuts and bolts. When used to separate rocket modules, it would either be necessary to place several such devices inside the body, which results in a limitation of the loading space and increases the weight of the entire structure. In addition, the safety of the system decreases as each device would need to be activated to separate the module (no built-in redundancy).

Patent publication U.S. Pat. No. 7,861,976 B2 discloses a mechanism based on a plurality of interconnected latches-hooks that connect two modules. Several disconnection mechanisms are disclosed in said publication, but all of them rely on the simultaneous turning of the hooks through a system of levers or gears. Such a complex mechanism is highly susceptible to failure.

Patent publication U.S. Pat. No. 6,227,493 B1 discloses a solution wherein the operating principle thereof is quite similar to the device described in patent publication RU2161111 C1. The connection is similarly divided into sections, but this time the holding elements are compliant parts that deform when the device is activated, thus separating the two modules. This solution, however, does not have a homogeneous structure, as it consists of shaped elements and a holding strip. Such a complex structure is susceptible to the risk of failure, which is particularly unfavorable given the application of the mechanism in the space industry.

SUMMARY

Implementations of the invention described herein provide a solution for separating modules of rockets, satellites or derivatives in such a way as to minimize overloads resulting from the operation of the device. In addition, they are intended to allow extensive scalability and reliability, and to provide as large a through diameter as possible for one of the detachable parts. Many of the known solutions are based on the action of explosives, which introduce large overloads and vibrations into the remaining components of the structure when detonated. Others, on the other hand, do not provide the ability to disconnect when subjected to high aerodynamic drag forces and are designed for much larger diameters, thus lacking the ability to be used in devices with smaller dimensions.

According to the present disclosure, a module separation mechanism, in particular for rockets, comprises a cylindrical first body, a cylindrical second body, and a ring connecting the two bodies. The module separation mechanism is characterized in that the ring comprises a first arm, a second arm, at least one tension lock with a cover. The tension lock has a tension lock nut positioned at a central portion of the tension lock and tension lock screws engaged with the tension lock nut and respectively positioned at opposing ends of the tension lock nut, each tension lock screw having a spherical washer at an end opposit the tension lock nut, wherein in an engaged position the tension lock screws are configured to respectively engage the first arm and the second arm, and the cover is configured to engage the tension lock nut to prevent unscrewing of the tension lock. The first body comprises at least one radially mounted actuator that is adapted to radially eject the tension lock screws from engagement with the first arm and the second arm of the ring together with the cover in a manner as to disengage said ring from the first body and the second body. The first body further comprises at least one pushing member adapted to axially eject the second body from the first body on disengagement of hte ring from the first body and the second body. An outer surface of the ring and an outer surface the cover are configured to be flush with respective outer surfaces of the first and second body. The first body and the second body each have an interface to connect the respective first body and the second body to other components of the rocket or other separable object.

In some implementations, the module separation mechanism comprises two independent modules (in this example the first body and the second body) connected by the ring, which is equipped with two tension locks angularly spaced from one another and engaged with the first arm and the second arm. Preferably but not necessarily, the first body comprises two independent, radially mounted actuators, each adapted to eject one of the two tension locks from the ring. Only one of the two tension locks is required to disengage said ring.

In some implementations, in their connected state, the tension lock screws are engaged with the first arm and the second arm, and the modules are sealed at their connection point by means of a gasket.

In some implementations, the connected modules are positioned by at least two positioning pins axially extending parallel to a central axis of the first body that prevent relative movement therebetween in a direction perpendicular to a central axis of the first body.

In some implementations, the actuator is electrically and/or pneumatically and/or pyrotechnically driven.

In some implementations, the tension lock is provided with a cover that is flush with respective outer surfaces of the first body and the second body, and which cover has a projection 9a that prevents the screws of the tension lock from being unscrewed.

In some implementations, the tension lock nut includes a plurality of external facets, and the projection of the cover extends radially inward toward the central axis of the first body and is configured to engage at least one of the plurality of external facets to prevent rotation of the tension lock nut.

In some implementations, the first body and the second body are separate and independent from the other components of the rocket or other separable object.

In some implementations, the pushing member is a spring, and most preferably the spring is a pushing gas spring. The use of pushing gas springs is preferable due to low operating costs and simplicity of handling.

Further variations and details of the present invention may be determined from the following drawings, claims, and detailed description.

BRIEF DESCRIPTION OF THE DRAWINGS

The present invention is explained in an embodiment illustrated in the drawing figures.

DETAILED DESCRIPTION

Figure 1:
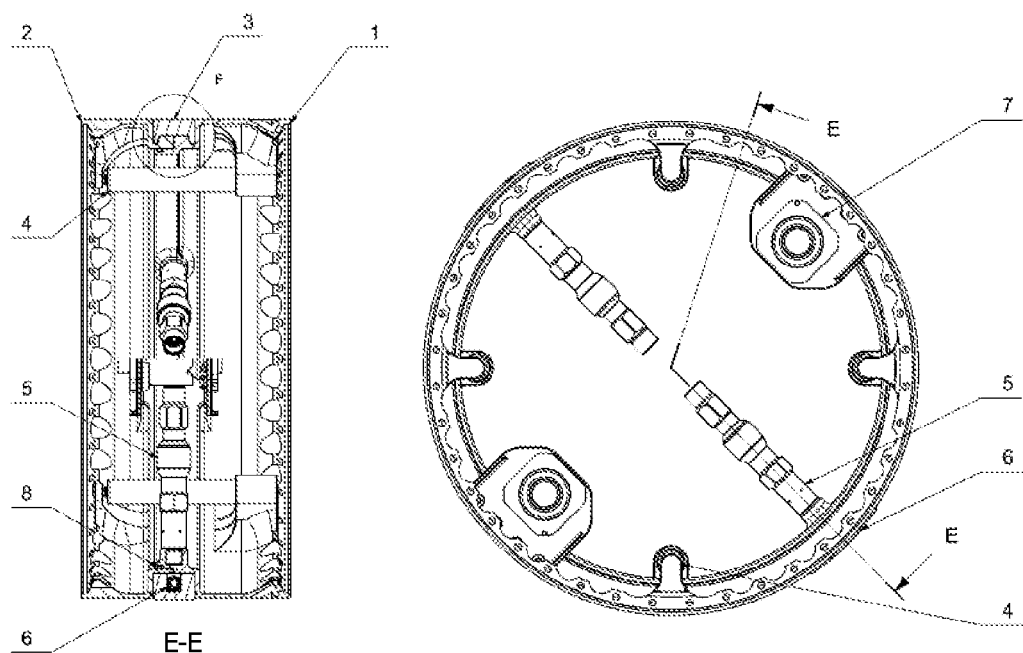
FIG. 1 shows a schematic diagram of the mechanism in various cross-sections.
Figure 2:
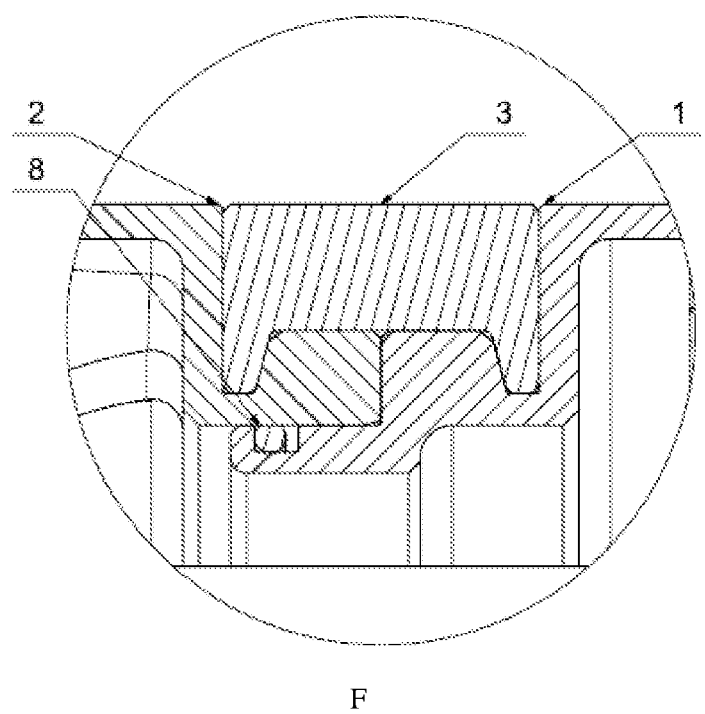
FIG. 2 shows an enlarged cross-sectional section of the body connection mechanism.
Figure 3:
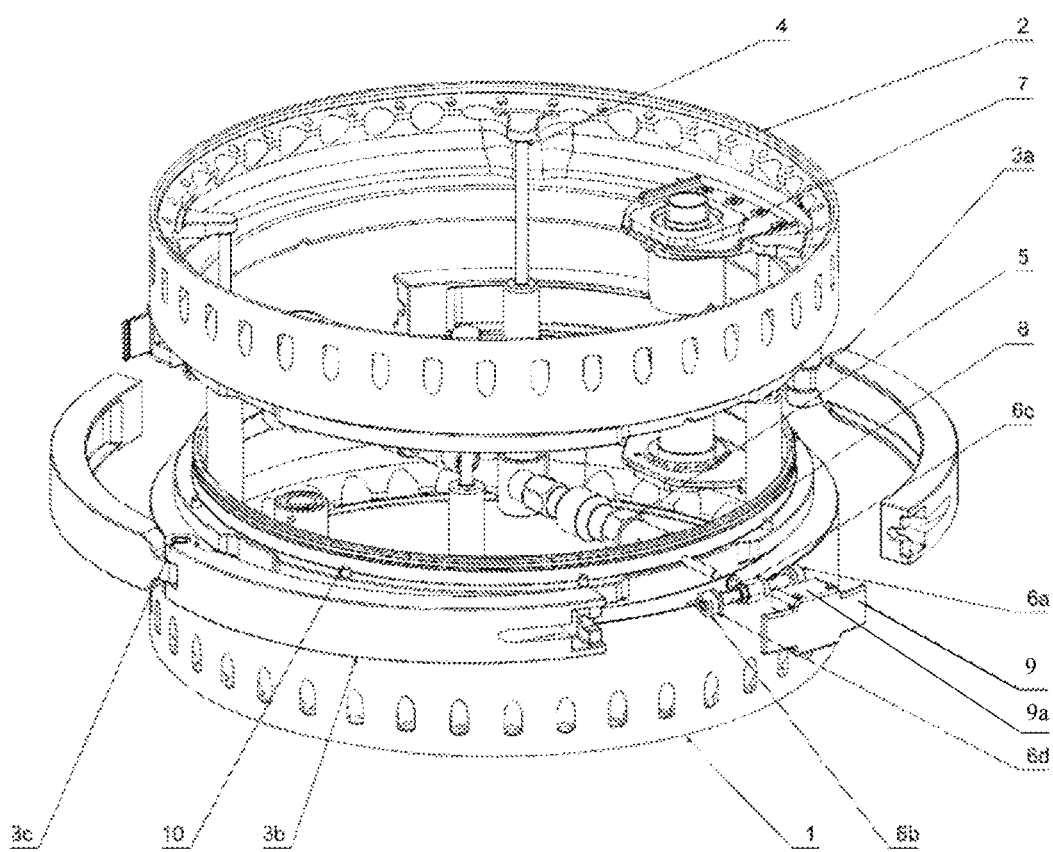
FIG. 3 shows an exploded view of the mechanism.

As shown in FIGS. 1-3, the module separation mechanism according to an embodiment comprises two cylindrical bodies, a first body 1 and a second body 2, a ring 3 connecting the two bodies, electrical connectors with fittings 7, two tension locks 6, and two actuators 5 and pushing members 4 in the form of two gas springs.

The bodies 1 and 2 are connected in a friction-shaped manner through a ring 3 having two articulated joints 3c located in a plane perpendicular to the tension locks 6. The ring 3 consists of two sets of parts—the first arm of the ring 3a, the second arm of the ring 3b, and the articulated joint 3c of the ring 3. The two sets of parts of the ring 3, superimposed on the connected first and second bodies, are connected by a tension lock 6 secured against unscrewing by a cover 9.

The bodies 1 and 2 have interfaces to connect the module to other components of the rocket or other separable object. Depending on the need, it is possible to adapt them to the standard used within the solution (e.g., RADAX, flange connection, axial connection). The plane of separation is between the two modules, in the plane of symmetry of the ring 3. The axial interconnection of the modules has allowed them to be sealed in their connected state at the point where they are connected by an O-ring type gasket 8, thus ensuring full tightness of the mechanism. This type is referred to as the radial build type, external (piston) sealing.

The disconnection of the modules is effected by the initiation of one of the two actuators 5, which push the tensioning lock 6 opposite them, holding the ring 3 halves. The ring 3 thus released no longer provides any resistance to the two modules. As a result of the action of the gas springs, the two modules are free to separate, ejecting the ring halves 3 outwards. Due to the use of spherical washers 6d under the bolt heads 6a, 6b of the tension lock 6, only one of the two actuators 5 needs to be actuated for correct separation to occur.

It is possible for the module separation mechanism to contain only one actuator 5 and only one tension lock 6. In this case, the ring 3 consists of four ring arms, three articulation joints 3c, and one tension lock 6 secured by a cover 9. Two of the three articulation joints are positioned analogously to the use of two actuators, while the third articulation joint is located in place of the second tension lock 6. The first body 1 has only one socket intended to accommodate the actuator 5, and the second body 2 has only one opening for the actuator piston.

In some embodiments, a pyrotechnic propulsion system is used to propel the actuators 5, wherein the charge used has a low mass but high energy density. The use of a low mass charge ensures that the explosion is small, controlled and does not cause stress on the rocket structure. The detonation of the charge in these embodiments is only intended to create sufficient pressure in the actuator to open the tensioning lock 6.

In certain embodiments, the mechanism according to this disclosure is housed in a rocket of small diameter, preferably in a rocket whose combined modules have an outer diameter in the range of 100-150 mm.

In the context of the present disclosure, the flushing with the outer surface of the ring 3 including the cover 9 of the tension lock 6 with the outer surface of the first body 1 and the second body 2 should be understood as a complete overlapping of their outer surfaces.

The present disclosure allows maximization of the internal through diameter inside one of the separated modules. Thus, after separation, it may be possible, for example, to realize an observation of the sky from inside one of the sections and to trigger a parachute system located in the axis of the upper of the separated modules. The invention also reduces the forces generated at the moment of separation, also thanks to the use of gas springs (instead of devices based on explosive charges).

The invention can be used to separate cargo compartments from the main part of the structure, thus facilitating the execution of tests and the subsequent recovery process.

The use of two actuators increases the reliability of the system, as only one allows separation to take place. The mechanism allows the use of a different number of gas springs with different characteristics, making it highly scalable and applicable to both small and large diameter objects.

The geometry used allows high forces and moments to be transferred in all directions.

The following is a list of reference numbers used in this description and the drawings.

1 First body
2 Second body
3 Ring
3a First arm of the ring
3b Second arm of the ring
3c Articulation joint of the ring
4 Pushing member
5 Actuator
6 Tension lock
6a, 6b Tension lock screws
6c Tension lock nut
6d Spherical washer
7 Electrical connectors with fittings
8 Gasket
9 Cover
9a Cover projection
10 Positioning pin

What is claimed is:

1. A module separation mechanism, in particular for a rocket, comprising:
   a cylindrical first body;
   a cylindrical second body; and
   a ring connecting the first body and the second body, wherein:
   the ring comprises a first arm, a second arm, a tension lock, and a cover,
   the tension lock comprises a tension lock nut positioned at a central portion of the tension lock and tension lock screws engaged with the tension lock nut and respectively positioned at opposing ends of the tension lock nut, each tension lock screw having a spherical washer at an end opposite the tension lock nut, wherein in an engaged position the tension lock screws are configured to respectively engage the first arm and the second arm, and the cover is configured to engage the tension lock nut to prevent unscrewing of the tension lock;
   the first body comprises at least one radially mounted actuator that is adapted to radially eject the tension lock screws from engagement with the first arm and the second arm of the ring together with the cover in a manner as to disengage the ring from the first body and the second body,
   the first body comprises at least one pushing member adapted to axially eject the second body from the first body on disengagement of the ring from the first body and the second body,
   an outer surface of the ring and an outer surface of the cover are configured to be flush with respective outer surfaces of the first body and the second body, and
   the first body and the second body each have an interface to connect the respective first body and the second body to other components of the rocket or other separable object.

2. The module separation mechanism according to claim 1,
   wherein the first body and the second body are independent from each other and are connected by the ring, and wherein the ring comprises two tension locks angularly spaced from one another and engaged with the first arm and the second arm.

3. The module separation mechanism according to claim 1, wherein:
   the ring comprises two tension locks,
   the at least one actuator comprises two independent, radially mounted actuators, each adapted to eject one of the two tension locks from the ring, and
   only one of the two tension locks is required to disengage the ring from the first body and the second body.

4. The module separation mechanism according to claim 1, wherein, in a connected state, the tension lock screws are engaged with the first arm and the second arm, and the first body and the second body are sealed at their connection point by a gasket.

5. The module separation mechanism according to claim 1, wherein, in a connected state, the first body and the second body are positioned by at least two positioning pins axially extending parallel to a central axis of the first body that prevent relative movement between the first body and the second body in a direction perpendicular to the central axis of the first body.

6. The module separation mechanism according to claim 1, wherein the actuator is at least one of electrically driven, pneumatically driven, or pyrotechnically driven.

7. The module separation mechanism according to claim 1, wherein:
   an outer surface of the cover is flush with respective outer surfaces of the first body and the second body, and
   the cover has a projection that prevents the tension lock screws from being unscrewed.

8. The module separation mechanism according to claim 1, wherein the pushing member comprises a spring.

9. The module separation mechanism according to claim 8, wherein the spring comprises a pushing gas spring.

10. The module separation mechanism according to claim 1, wherein the first body and the second body are separate and independent from the other components of the rocket or other separable object.

11. The module separation mechanism according to claim 7, wherein: the first body includes a central axis, the tension lock nut includes a plurality of external facets, and the projection extends radially inward toward the central axis and is configured to engage at least one of the plurality of external facets to prevent rotation of the tension lock nut.

* * * * *